Dec. 1, 1970  W. J. BERLEYOUNG ET AL  3,543,594
CONTROL DEVICE MANIPULATOR MEANS
Filed Sept. 30, 1968  2 Sheets-Sheet 1

INVENTORS
WALTER J. BERLEYOUNG
KENNETH G. KREUTER
KLAUS P. MUELLER

BY Candor & Candor

THEIR ATTORNEYS

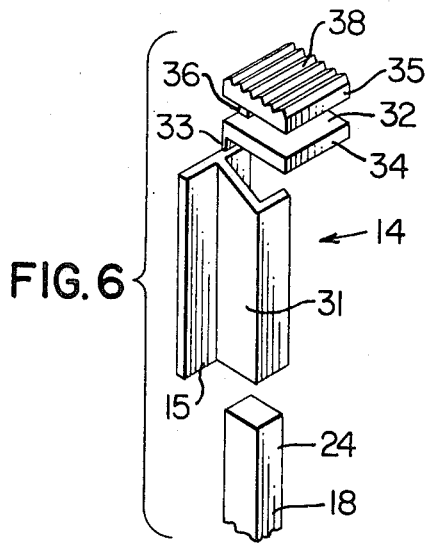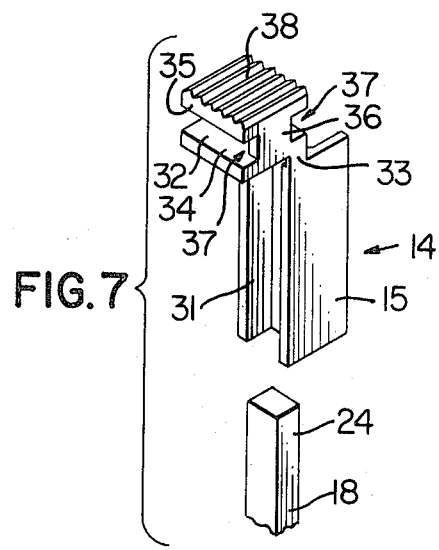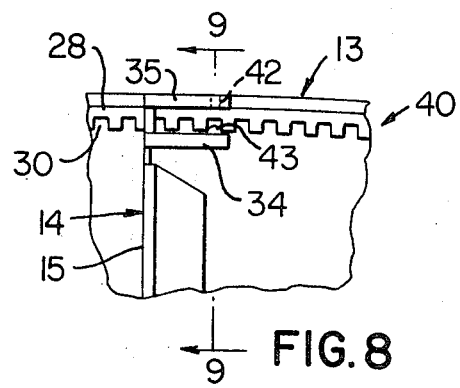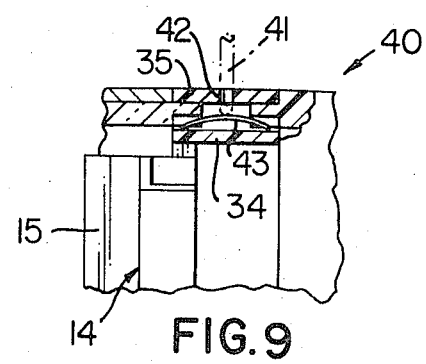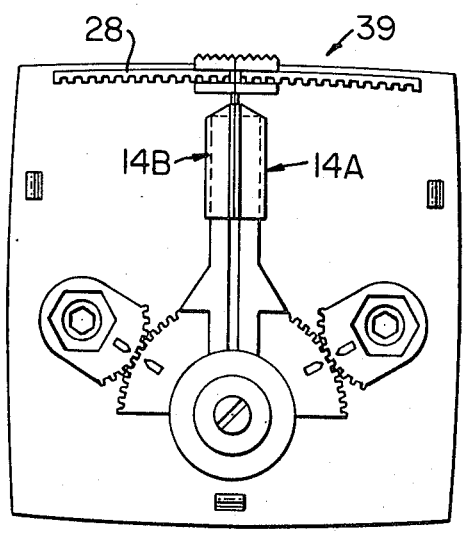

United States Patent Office 3,543,594
Patented Dec. 1, 1970

3,543,594
CONTROL DEVICE MANIPULATOR MEANS
Walter J. Berleyoung, Kenneth G. Kreuter, and Klaus P. Mueller, Goshen, Ind., assignors to Robertshaw Controls Company, Richmond, Va., a corporation of Delaware
Filed Sept. 30, 1968, Ser. No. 763,511
Int. Cl. F16h 21/16
U.S. Cl. 74—89.18
20 Claims

ABSTRACT OF THE DISCLOSURE

This disclosure relates to a control device having a rotatable control member provided with an arm that is slidably interconnected to a manipulator means that is guided relative to the control device by a guide track, said manipulator means being a one-piece integral structure having the guide part thereof integrally interconnected to the slide part thereof by a hinge means whereby the guide part can move in one direction and the slide part can move in another direction while moving the control member to a desired position thereof.

---

This invention relates to a control device manipulator means as well as to an improved manipulator means.

It is well known that control devices have movable control members that are manually moved to set the control device at the desired setting.

However, prior known manipulator means for such control members are secured thereto in such a manner that such secured manipulator means must move in unison with the control member.

According to the teachings of this invention a manipulator means is provided that is guided in its movement relative to the control device along a path different than the path of movement of the control member interconnected thereto whereby the guided part of the manipulator means can be controlled in its movement.

In particular, one embodiment of this invention comprises a one-piece manipulator means that has a slide part splined to the control member of the control device so that a guide part of the manipulator means can be guided in its movement by a guide track of the control device and still cause movement of the control member along a path different than the path of movement of the guide part, the guide part and slide part of the manipulator means being integrally interconnected together by a flexible hinge means of the manipulator means.

Accordingly, it is an object of this invention to provide an improved control device having one or more of the novel features set forth above or hereinafter shown or described.

Another object of this invention is to provide an improved manipulator means for such a control device or the like.

Other objects, uses and advantages of this invention are apparent from a reading of this description which proceeds with reference to the accompanying drawings forming a part thereof and wherein:

FIG. 6 is an exploded perspective view of the manipulator means of this invention and the upper end of the control member of the control device.

FIG. 7 is a view similar to FIG. 6 except taken from the other side thereof.

FIG. 8 is a fragmentary view similar to FIG. 2 and illustrates another embodiment of this invention.

FIG. 9 is a cross-sectional view taken on line 9—9 of FIG. 8 and illustrates the method of moving the manipulator means thereof.

FIG. 10 is a view similar to FIG. 2 and illustrates another embodiment of this invention.

Figure 1:
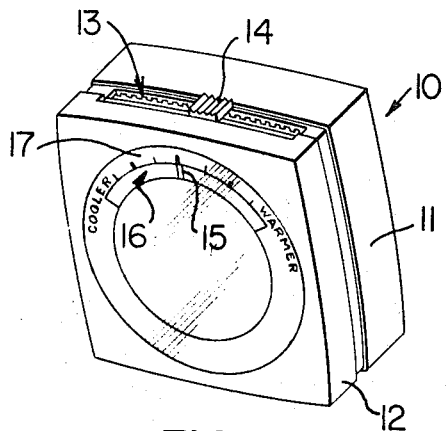
FIG. 1 is a front perspective view of the improved control device of this invention.

While the various features of this invention are hereinafter described and illustrated as being particularly adapted to control a thermostatic control device, it is to be understood that the various features of this invention can be utilized singly or in any combination thereof to provide manipulator means for any desired type of control device.

Therefore, this invention is not to be limited to the particular embodiments illustrated in the drawings because the drawings are merely utilized to illustrate some of the wide variety of uses of this invention.

Referring now to FIG. 1, the improved control device of this invention is generally indicated by the reference numeral 10 and comprises a housing means 11 with a cover plate or member 12 detachably secured thereto in any suitable manner to define a slot means 13 therewith through which the manipulator means 14 of this invention projects and can be manually engaged to set the control point for the control device 10 to maintain as indicated by a pointer part 15 of the manipulator means 14 being viewed through a window means 16 of the cover member 12 and related to a dial means 17 on the cover member 12.

Figure 3:
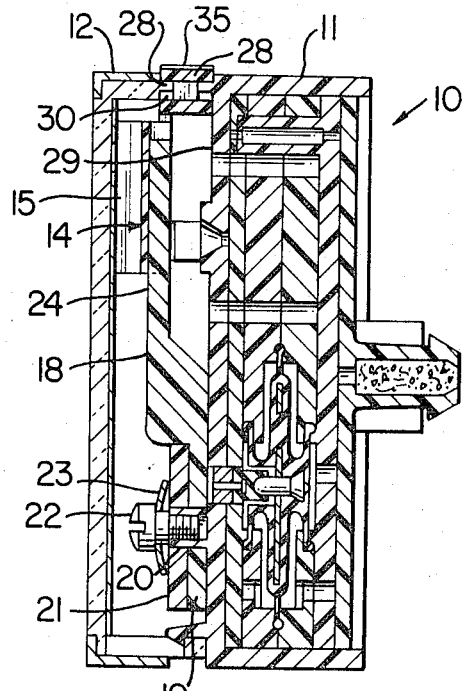
FIG. 3 is a cross-sectional view of the control device and is taken substantially on line 3—3 of FIG. 2, FIG. 3 showing the cover member in place.
Figure 2:
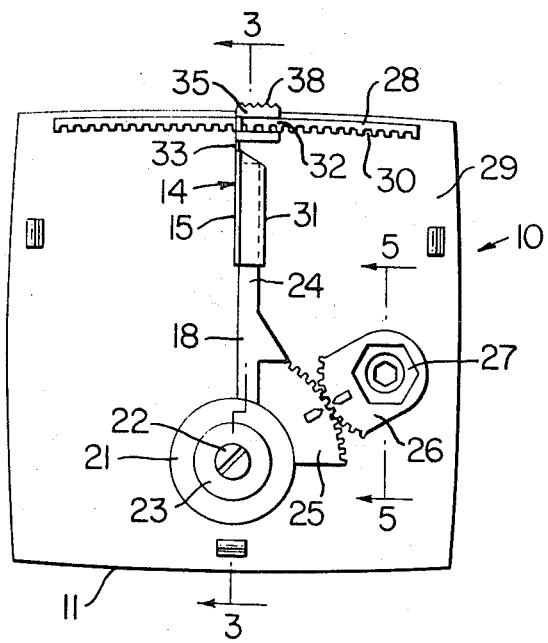
FIG. 2 is an enlarged front view of the control device of FIG. 1 with the cover member removed.

As illustrated in FIGS. 2 and 3, the control device 10 has a control member 18 provided with an end 19 telescoped on an internally threaded extension 20 of the housing means 11, a washer-like member 21 also being telescoped on the extension 20 against the end 19 of the control member 18 and being urged toward the same to stack the end 19 of the control member 18 against the housing means 11 to provide "feel" to adjustment of the control member 18 by a threaded fastening member 22 being threaded in the extension 20 and compacting a beveled spring means 23 against the washer 21.

The control member 18 has an arm end 24 extending therefrom which is substantially rectangular in cross-section. In addition, a sector gear portion 25 extends from the end 19 of the control member 18 and is disposed in meshing relation with a gear means 26 that is fastened to an adjusting member 27 rotatably mounted to the housing means 11. Rotation of the adjusting member 27 sets the control point that the control device 10 is to maintain and since the particular details of the operation of the control device 10 does not form part of this invention, no further description of the parts and operation of the control device 10 will be made except to state that the control member 18 could set the control point for the control device 10 in any other manner as desired.

The housing means 11 has a substantially straight guide track 28 projecting outwardly from the upper end of the face 29 thereof, the guide track 28 having a plurality of notches 30 in the underside thereof for a purpose hereinafter described. A similar guide track 28 projects inwardly from the cover member 12 and has notches 30 in the underside thereof, the guide tracks 28 being spaced from each other in aligned relation when the cover member 12 is assembled to the housing means 11 in the manner illustrated in FIG. 3.

The manipulator means 14 is best illustrated in FIGS. 6 and 7 and comprises a one-piece member having a slide part 31 that is substantially U-shaped in transverse cross section so as to receive the end 24 of the control member 18 in a manner to be slidable relative thereto while causing rotation of the control member 18. A guide part 32 of the manipulator means 14 is integrally interconnected to the slide part 31 by a flexible hinge means or strip 33, the guide part 32 having two rectangular plates 34 and 35 held in spaced relation by a side member 36 that is narrower in width than the width of the plates 34 and 35 whereby the guide part 32 defines two substantially U-shaped channels 37 that are adapted to respectively receive the guide tracks 28 of the cover member 12 and housing means 11.

While the manipulator means 14 can be formed of any suitable material that will provide the flexibility of the hinge part 33 and withstand many movements of the manipulator means 14 in a manner hereinafter described, the embodiment of the manipulator means 14 illustrated in the drawings is formed of polypropylene.

If desired, the top surface 38 of the plate 35 of the manipulator means can be roughened, knurled or ribbed as shown to facilitate manual movement of the manipulator means 14 to set a desired control point for the control device 10 in a manner now to be described.

Figure 4:
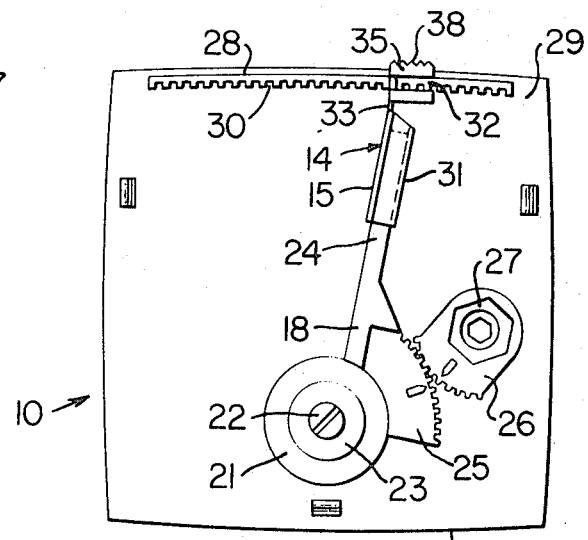
FIG. 4 is a view similar to FIG. 2 with the control device being set in another position thereof.
Figure 5:
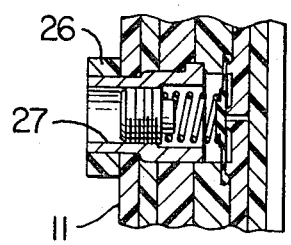
FIG. 5 is a fragmentary, enlarged cross-sectional view taken substantially on line 5—5 of FIG. 2.

When the operator or the like desires to change the setting of the control device 10, such as from the setting of FIG. 2 to the setting of FIG. 4, the operator can merely place the end of his finger on the top surface 38 of the plate 35 of the manual manipulator means 14 and pushes the same from left to right whereby the guide part 32 is guided to the right along the guide tracks 28 in substantially a linear direction while the slide part 31 slides up on the control member arm 24 and rotates the same in a clockwise direction to effect a change in the setting of the control device 10, the hinge part 33 of the manipulator means 14 permitting the two different types of movement of the guide part 32 and slide part 31 whereby the slide part 31 rotates in unison with the control member 18 while sliding relative thereto. Thus, the pointer portion 15 of the manipulator means 14 reflects the actual rotation of the control member 18 to give a true setting indication at the window 16 of the control device 10.

Accordingly, it can be seen that the guide part 32 of the manipulator means 14 can be moved back and forth in substantially a linear path while the slide part 31 there of is rotated in unison with the control member 18 to set the control member 18 in the desired position thereof.

If desired, the manipulator means 14 of this invention can be duplicated in a substantial mirror image of itself to provide two control settings, such as for controlling the daytime and nighttime settings of a single heat exchanger thermostat for a house or building. For example, reference is now made to FIG. 10 wherein another control device 39 is illustrated having two manipulator means 14A and 14B respectively formed in the same manner as the manipulator means 14 previously described whereby like parts are indicated by like reference numerals followed by the reference letter A or B as appropriate. Obviously, the right hand manipulator means 14A would control the day-time setting for the control device 10 as such temperature settings are normally higher than the temperature settings for nighttime being controlled by the left hand manipulator 14B.

Therefore, it can be seen that the guide tracks 28 of the control device 39 can be utilized to guide the movements of two or more manipulator means of this invention.

If desired, the top plate 35 of the manipulator means 14 of this invention can be modified in the manner illustrated in FIGS. 8 and 9 to produce a substantially tamper-proof control device 40 that requires a special tool 41 to effect new settings thereof. For example, the top plate 35 can be cut down to be substantially level with the top of the slot 13 and have an opening 42 passing therethrough and aligned with a detent spring 43 carried by the lower plate 34 and cooperable with the notches 30 in the underside of one or both of the guide tracks 28.

In this manner, a person desiring to change the setting of the control device 40 merely inserts the tool 41 through the opening 42 to depress the detent spring 43 out of its associated notch or notches 30 in the guide track or tracks 28 and, while holding the detent spring 43 depressed, moves the manipulator means 14 to the desired position thereof whereby subsequent retraction of the tool 41 from the opening 42 permits the detent spring 43 to snap up into its newly aligned notch or notches 30 to lock the manipulator means 14 in its newly set position. Thus, a person merely passing the control device 40 of FIGS. 8 and 9 cannot accidentally or by design push the manipulator means 14 to a new position thereof without first depressing the detent spring 43 in the manner previously described.

Accordingly, it can be seen that this invention not only provides an improved control device manipulator means, but also this invention provides an improved manipulator means for any desired control device or the like.

What is claimed is::

1. In a control device having a housing means and a movable control member mounted thereto, the improvement comprising a manipulator means movably mounted to said control member and having guide means thereon, said housing means having a guide track receiving said guide means whereby said manipulator means is movable along said guide track to set said control member in a desired position thereof while said manipulator means moves relative to said control member while moving said control member relative to said housing means, said guide track providing a path of movement for said guide means, said control member being movable relative to said housing means along a path of movement having a direction different from said path of movement of said guide means.

2. In a control device having a housing means and a movable control member mounted thereto, the improvement comprising a manipulator means movably mounted to said control member and having guide means thereon, said housing means having a guide track receiving said guide means whereby said manipulator means is movable along said guide track to set said control member in a desired position thereof while said manipulator means moves relative to said control member while moving said control member relative to said housing means, said manipulator means having a part that is movably interconnected to said control member, said manipulator means having hinge means interconnecting said part to said guide means thereof.

3. In a control device as set forth in claim 2, said guide means, hinge means and said part of said manipulator means being a one-piece integral structure.

4. In a control device as set forth in claim 3, said guide track being disposed in one direction relative to said housing means and said control member being disposed substantially transverse to said guide track.

5. In a control device as set forth in claim 1, said manipulator means being slidable relative to said control member while being interconnected thereto to move the same to a desired control setting position.

6. In a control device as set forth in claim 5, said control member being rotatably mounted to said housing means.

7. In a control device as set forth in claim 1, said guide track having a plurality of notches provided therein, said guide means of said manipulator means having detent means for releasably locking into a desired notch to hold said control member in a desired position thereof.

8. In a control device as set forth in claim 7, said manipulator means having an opening therein to provide access means to said detent means to release said detent means from its associated notch to permit movement of said manipulator means relative to said guide track.

9. In a control device having a housing means and a movable control member mounted thereto, the improvement comprising a manipulator means movably mounted to said control member and having guide means thereon, said housing means having a guide track receiving said guide means whereby said manipulator means is movable along said guide track to set said control member in a desired position thereof while said manipulator means moves relative to said control member while moving said control member relative to said housing means, said control device having another control member, and another manipulator means movably mounted to said other control member and having guide means cooperable with said guide track whereby said other manipulator means is movable along said guide track to set said other control member in a desired position thereof while said other manipulator means moves relative to said other control member.

10. In a control device as set forth in claim 1, said housing means having a cover member provided with another guide track that is disposed spaced from and aligned relative to said first-named guide track, said cover member defining a slot means with said housing means, said manipulator means having said guide means receiving both of said guide tracks to be guided thereby, said guide means having a portion thereof projecting through said slot means to be manually engaged for moving said manipulator means.

11. In a control device as set forth in claim 10, said cover member having window means therein, said manipulator means having a part thereof viewable through said window means to indicate the setting of said control member.

12. In a control device having a housing means and a movable control member mounted thereto, the improvement comprising a manipulator means movably mounted to said control member and having guide means thereon, said housing means having a guide track receiving said guide means whereby said manipulator means is movable along said guide track to set said control member in a desired position thereof while said manipulator means moves relative to said control member while moving said control member relative to said housing means, said control member being rotatably mounted to said housing means and having a sector gear portion, said housing means having a control adjusting member rotatably mounted thereto and provided with gear means disposed in meshing relation with said sector gear portion.

13. In a control device as set forth in claim 1, said control member having a part provided with a rectangular transverse cross-sectional configuration, said manipulator means having a slide part provided with a channel therein receiving said part of said control member to spline said guide part and said control member together.

14. In a control device having a housing means and a movable control member mounted thereto, the improvement comprising a manipulator means movably mounted to said control member and having guide means thereon, said housing means having a guide track receiving said guide means whereby said manipulator means is movable along said guide track to set said control member in a desired position thereof while said manipulator means moves relative to said control member while moving said control member relative to said housing means, said guide means having a part provided with a U-shaped transverse cross-sectional configuration that receives said guide track of said housing means.

15. In a control device as set forth in claim 1, said manipulator means having pointer means thereon for indicating the setting of said control member.

16. A manipulator means for a control device or the like and having a slide part for slidably interconnecting to a control member of said control device, said manipulator means having a guide part for guiding movement of said manipulator means relative to said control device, said manipulator means having hinge means interconnecting said guide part to said slide part to permit movement of said guide part in one direction and movement of said slide part in another direction.

17. A manipulator means as set forth in claim 16 wherein said guide part, said hinge means and said slide part are a one-piece integral structure.

18. A manipulator means as set forth in claim 16 wherein said guide part has an end surface that provides an engaging surface for moving said manipulator means relative to said control device.

19. A manipulator means as set forth in claim 16 wherein said slide part of said manipulator means has a U-shaped transverse cross-sectional configuration.

20. A manipulator means as set forth in claim 16 wherein said guide part of said manipulator means has a U-shaped transverse cross-sectional configuration.

References Cited

UNITED STATES PATENTS

| 744,444 | 11/1903 | Voss | 74—89.18 |
|---|---|---|---|
| 1,164,443 | 12/1915 | Yiakas | 74—89.19 |
| 1,321,609 | 11/1919 | Eck | 74—89.19 |
| 1,392,299 | 10/1921 | Carlson | 74—533 |
| 2,284,179 | 5/1942 | Thelin | 74—89.18 |
| 3,002,656 | 10/1961 | Garber | 74—527 |
| 3,088,727 | 5/1963 | Pelagatti | 74—89.18 |

WESLEY S. RATLIFF, Jr., Primary Examiner

U.S. Cl. X.R.

74—533